United States Patent
Eck et al.

(10) Patent No.: US 10,906,596 B2
(45) Date of Patent: Feb. 2, 2021

(54) STRUCTURAL PART OF A BODY IN WHITE OF A VEHICLE AND ASSOCIATED MANUFACTURING METHOD

(71) Applicants: FAURECIA AUTOMOTIVE COMPOSITES, Nanterre (FR); Faurecia Emissions Control Technologies, USA, LLC, Columbus, IN (US)

(72) Inventors: Benedikt Eck, Saint-Malo (FR); Gilles Nedelec, Laval (FR); Yang Cao, Troy, MI (US); Pankaj Bedmutha, Pune (IN); Louis Moreau-Gentien, Royal Oak, MI (US)

(73) Assignee: FAURECIA AUTOMOTIVE COMPOSITES, Nanterre (FR)

( * ) Notice: Subject to any disclaimer, the term of this patent is extended or adjusted under 35 U.S.C. 154(b) by 202 days.

(21) Appl. No.: 16/240,884

(22) Filed: Jan. 7, 2019

(65) Prior Publication Data
US 2019/0210662 A1 Jul. 11, 2019

Related U.S. Application Data

(63) Continuation-in-part of application No. 15/865,307, filed on Jan. 9, 2018, now Pat. No. 10,556,627.

(30) Foreign Application Priority Data

Jan. 15, 2018 (FR) ........................... 18 50301

(51) Int. Cl.
*B62D 29/04* (2006.01)
*B62D 25/08* (2006.01)
(Continued)

(52) U.S. Cl.
CPC ......... *B62D 29/048* (2013.01); *B62D 25/088* (2013.01); *B60G 13/003* (2013.01); *B60G 15/068* (2013.01); *B60G 2204/128* (2013.01)

(58) Field of Classification Search
CPC .......................... B62D 29/004; B62D 25/088
(Continued)

(56) References Cited

U.S. PATENT DOCUMENTS 5,456,517 A 10/1995 Kalian et al.
6,135,498 A 10/2000 Vlahovic
(Continued)

FOREIGN PATENT DOCUMENTS

EP 0494562 A1 7/1992
FR 2812268 A1 2/2002
FR 2967965 A1 6/2012

OTHER PUBLICATIONS

French Search Report for French Application No. 1850301 dated Oct. 23, 2018.

*Primary Examiner* — Jason S Morrow

(57) ABSTRACT

A structural part for a body in white of a vehicle includes a frame formed by at least two branches connected to one another in at least one connecting zone and separated from each other by at least one gap in a zone of least stress. The frame is made of a first composite material comprising a plurality of continuous fibers impregnated with a first polymeric material. A body is integral with the frame extending in the gap and connecting the two branches in the zone of least stress. The body is made of a second material that is different from the first composite material and comprises at least a second polymeric material, wherein the body is integral with the branches.

16 Claims, 25 Drawing Sheets

(51) Int. Cl.
 *B60G 13/00* (2006.01)
 *B60G 15/06* (2006.01)

(58) Field of Classification Search
 USPC .......................................................... 296/198
 See application file for complete search history.

(56) References Cited

U.S. PATENT DOCUMENTS

| | | |
|---|---|---|
| 8,448,966 B2 | 5/2013 | Rawlinson et al. |
| 8,973,980 B2 | 3/2015 | Mildner et al. |
| 9,010,848 B2 | 4/2015 | Andree et al. |
| 9,278,714 B2 | 3/2016 | Amemiya |
| 9,616,937 B2 | 4/2017 | Sasaki |
| 9,751,564 B2 | 9/2017 | Muehlhausen et al. |
| 2013/0244004 A1 | 9/2013 | Erb et al. |
| 2014/0062106 A1* | 3/2014 | Han ........................ B60R 19/34 |
| | | 293/133 |
| 2015/0290989 A1 | 10/2015 | Kim et al. |
| 2016/0244103 A1 | 8/2016 | Amemiya |
| 2016/0264176 A1 | 9/2016 | Balzer et al. |
| 2017/0008569 A1 | 1/2017 | Hofmann et al. |
| 2017/0259856 A1* | 9/2017 | An ........................ B62D 25/081 |
| 2018/0029649 A1* | 2/2018 | Maruyama ........... B62D 25/088 |
| 2019/0092394 A1* | 3/2019 | Masuda ............... B62D 25/088 |
| 2019/0161126 A1* | 5/2019 | Dettling .................... B60K 5/12 |
| 2019/0210655 A1* | 7/2019 | Cao ...................... B62D 25/088 |
| 2019/0210661 A1* | 7/2019 | Cao ...................... B62D 25/088 |
| 2019/0210662 A1* | 7/2019 | Eck ....................... B60G 13/003 |
| 2020/0086921 A1* | 3/2020 | Watanabe .............. B62D 21/11 |
| 2020/0086927 A1* | 3/2020 | Watanabe ............ B60G 15/067 |
| 2020/0189663 A1* | 6/2020 | Kaneb .................. F16F 9/3271 |

* cited by examiner

STRUCTURAL PART OF A BODY IN WHITE OF A VEHICLE AND ASSOCIATED MANUFACTURING METHOD

CROSS-REFERENCE TO RELATED APPLICATIONS

This application is a continuation-in-part of U.S. application Ser. No. 15/865,307, filed Jan. 9, 2018, and a U.S. non-provisional application claiming the benefit of French Application No. 18 50301, filed on Jan. 15, 2018, which is incorporated herein by herein in its entirety.

FIELD OF INVENTION

The present invention relates to a structural part for a body in white (BIW) of a vehicle.

The invention also relates to a method of manufacturing such a structural part.

BACKGROUND OF THE INVENTION

The body in white forms the "skeleton" of the vehicle and is therefore subject to significant mechanical strains. The structural parts making up the body in white must therefore have particular mechanical characteristics, especially in terms of rigidity, deformability, mechanical strength, etc.

To this end, the structural parts constituting the body in white of a vehicle are generally composed of several parts of stamped steel welded together. Structural parts made of lighter materials, but with satisfactory mechanical characteristics, are also known, thus reducing the weight of the vehicles and the energy required during their use.

Shock towers made of die cast aluminum alloy and magnesium are used, for example, in high-end vehicles. However, such parts can not be produced in large volumes because of the manufacturing costs involved.

The design of composite material parts has also been proposed in order to lighten the structure of the vehicle. In FR 2967965, a shock tower comprising reinforcing ribs is made in one piece of a thermoplastic material filled with short fibers.

However, such a structural part is not completely satisfactory. In fact, such a material does not have mechanical properties that are comparable to those of metallic materials. Continuous fibers have better mechanical properties, but they represent a significant manufacturing and material cost, which makes the piece unsuitable for large-scale production.

SUMMARY OF THE INVENTION

One of the goals of the invention is to propose a structural part for a body in white of a vehicle having mechanical properties that are comparable to those obtained with metallic materials, while being lighter, less expensive to manufacture, and that are capable of being produced industrially in large quantities.

The object of the invention is a structural part for a body in white comprising:
a frame formed by at least two branches connected to one another in at least one connecting zone and separated from each other by at least one gap in a zone of least stress, said frame being made of a first composite material comprising a plurality of continuous fibers impregnated with a first polymeric material, and
a body attached to the frame extending in said at least one gap and connecting the at least two branches in the zone of least stress, said body being made of a second material that is different from the first composite material and comprising at least a second polymeric material, said body being integral with the at least two branches.

The frame gives the structural part mechanical properties that are comparable to those of a structural part made of metallic material, while maintaining costs that are compatible with large-scale production thanks to the body being made of a less expensive material. Such a less expensive material may be used because the body extends in a zone of least stress in which the mechanical properties of the structural part are less crucial than in the zone(s) into which the frame extends.

The part according to the invention may comprise one or more of the following characteristics, taken in isolation or in any technically feasible combination:
the body extends in the continuity of at least part of the frame;
the structural part comprises at least one insert molded on the body and/or on a branch;
the frame comprises fixing regions;
the frame comprises at least 20% by volume of continuous fibers;
the structural part is intended to undergo stresses oriented in a mean direction, the majority of continuous fibers being arranged to define an angle substantially less than or equal to 10° with said mean direction;
the body is made of polymeric material reinforced with cut fibers; and
the structural part further comprises reinforcing ribs protruding from the frame and/or the body.

According to another aspect, the invention also relates to a shock tower assembly comprising a shock tower body formed by a structural part of the above-mentioned type and a wheel cover made of a polymer composite material and integrated into the shock tower body to form a single-piece component and/or at least one reinforcement member integrated into the shock tower body.

The shock tower assembly according to the invention may comprise one or more of the following characteristics, taken in isolation or in any technically feasible combination:
the at least one reinforcement member is comprised of at least one of a metal and a continuous fiber reinforced polymer composite material;
the at least one reinforcement member comprises at least one metal plate or bracket and/or at least one mount structure comprised of continuous fiber reinforced polymer composite material;
the at least one mount structure comprises a shock tower cap configured to receive a strut component and/or a suspension control arm mount flange;
the at least one reinforcement member comprises at least one metal plate and at least one mount structure comprised of continuous fiber reinforced polymer composite material, the shock tower assembly further including a first overmold interface between the shock tower body and the at least one metal plate and a second overmold interface between the at least one mount structure and the shock tower body;
the at least one metal plate is integrated into the shock tower body at the first overmold interface and wherein the at least one mount structure comprised of the continuous fiber reinforced polymer composite material is integrated into the shock tower body at the second overmold interface; and the shock tower assembly includes a third overmold interface that integrates at least one of a nut, fastener, and sleeve into the shock tower body.

The invention also relates to a method for manufacturing a structural part for a body in white of a vehicle, as described above, and comprising the following steps:

providing a frame formed by at least two branches connected to one another in at least one connecting zone and separated from each other by at least one gap in a zone of least stress, said frame being made of a first composite material comprising a plurality of continuous fibers impregnated with a first polymeric material, and forming a body that is attached to the frame extending in said at least one gap and connecting the at least two branches in the zone of least stress, the body being made of a second material that is different from the first material and comprising at least a second polymeric material, said body being integral with the at least two branches.

The method according to the invention may comprise one or more of the following characteristics, taken in isolation or in any technically feasible combination:

the formation of the body by injection of the second material into the gap.

According to another aspect, the invention also relates to a method for forming a shock tower comprising:

molding a shock tower body forming a structural part manufactured according to the above-mentioned method; and at least one of the following steps integrally molding at least one reinforcement member with the shock tower body at a first overmold interface to form a single-piece component, wherein the at least one reinforcement member is comprised of at least one of a metal and a continuous fiber reinforced polymer composite material, or integrally molding a wheel cover comprised of a polymer composite material with the shock tower body to form the single-piece component.

According to another feature of this method, the at least one reinforcement member comprises at least one first reinforcement member comprised of the metal material and at least one second reinforcement member comprised of the continuous fiber reinforced polymer composite material, and the method includes:

integrally molding the at least one first reinforcement member to the shock tower body via the first overmold interface, and integrally molding the at least one second reinforcement member to the shock tower body via a second overmold interface, the method preferably including forming at least one third overmold interface that integrates at least one of a nut, fastener, and sleeve into the single piece component.

BRIEF DESCRIPTION OF THE DRAWINGS

The invention will be better understood upon reading the description which follows, given solely by way of example, and with reference to the appended drawings, wherein.

DETAILED DESCRIPTION

Figure 1:
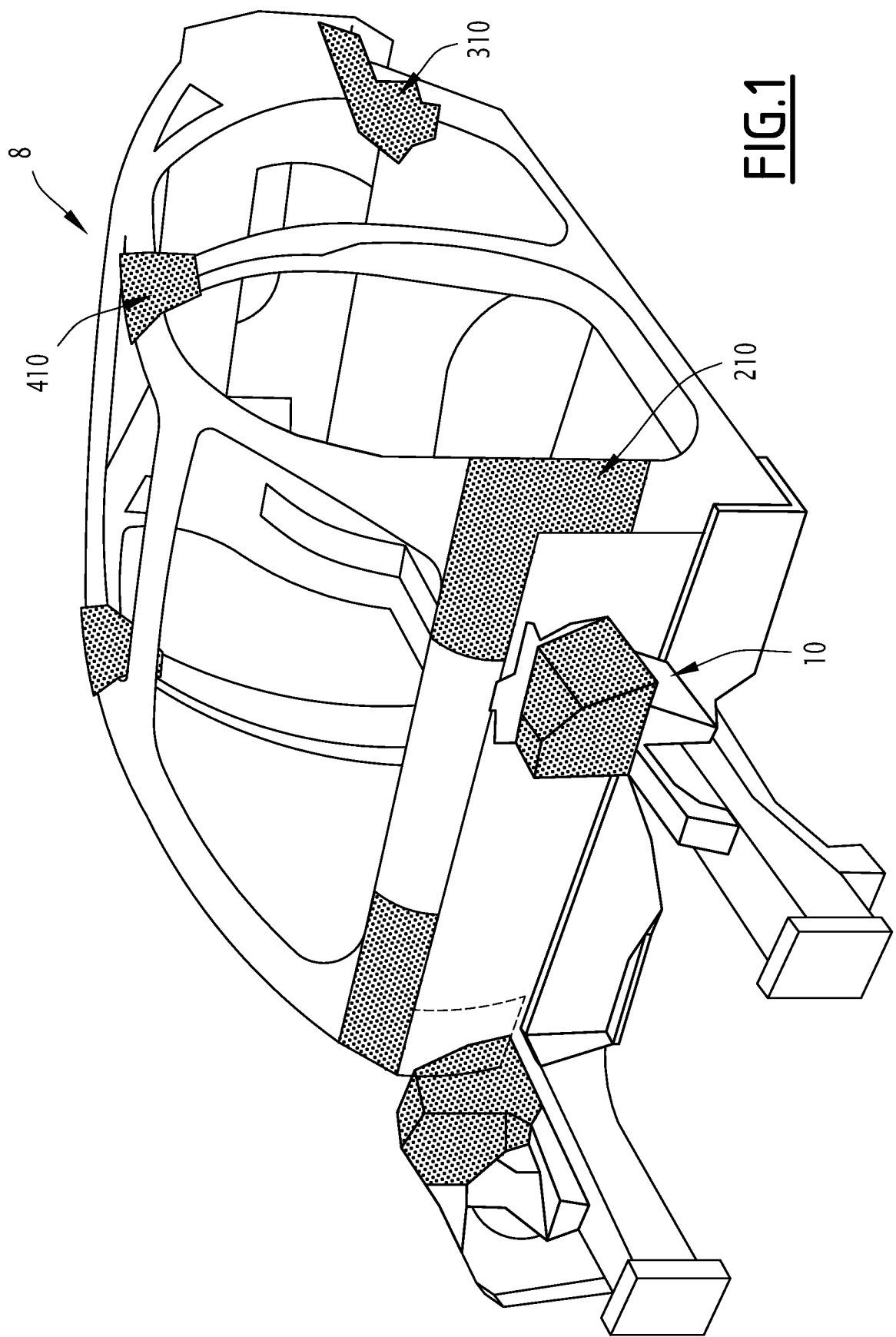
FIG. 1 shows a schematic view of a vehicle body in white comprising a plurality of structural parts according to the invention.

A vehicle body in white 8 according to the invention is shown schematically in FIG. 1. The vehicle body in white constitutes the skeleton of the vehicle and is formed by a frame comprising a plurality of structural parts 10 connected to each other in order to be integral with each other, and immobile relative to each other, apart from the deformations that they are likely to undergo when the vehicle is being used.

Various components, such as the chassis and the engine, and equipment, including vents, trim and interior parts and the electrical system, are then mounted on the body in white 8.

The invention applies to different types of structural body in white parts, as will be described below.

Figure 2:
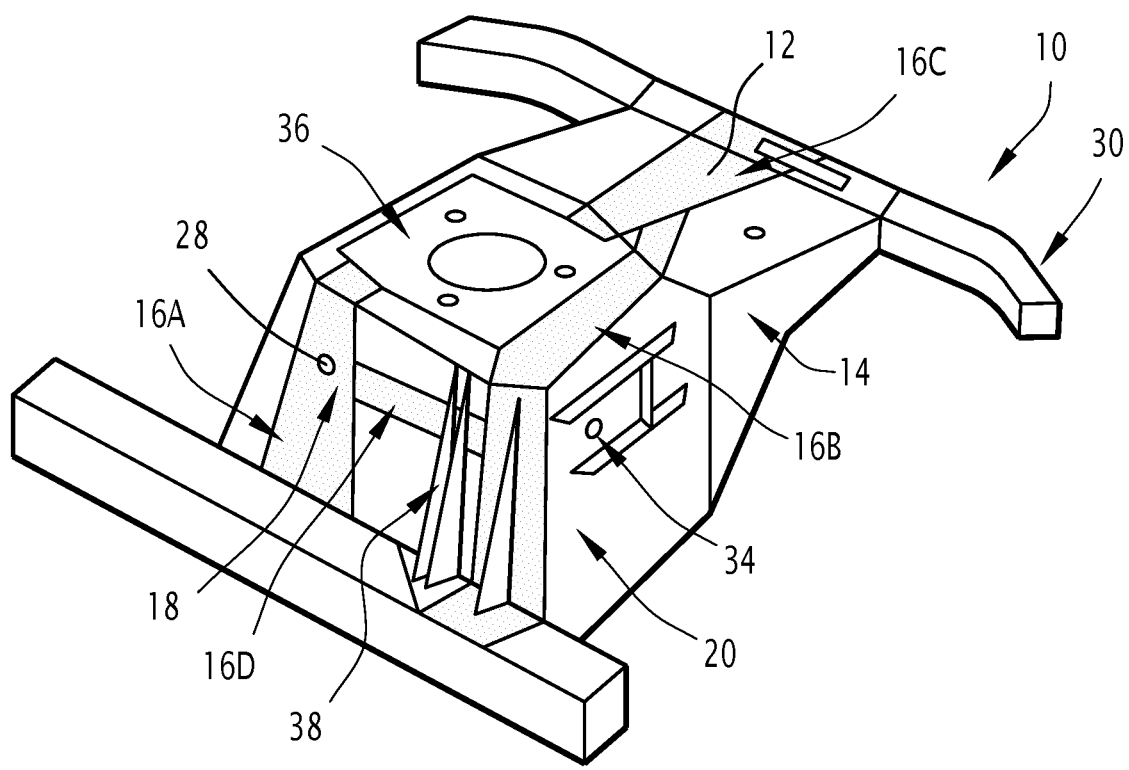
FIG. 2 shows a schematic view of a first structural part of a vehicle body in white according to the invention.

A first structural part 10 according to the invention is shown schematically in FIGS. 1 and 2.

In this example, the first structural part 10 forms a shock tower, that is intended to be fixed to the front of the body in white 8 around the engine compartment in order to receive a shock absorber of the vehicle to absorb the vibrations generated by this shock tower. Alternatively or additionally, the first structural part 10 may be fixed to the shock towers located at the rear of a vehicle.

The shock tower has, for example, a dome shape. It forms a bearing surface for the spring of the shock tower and includes an opening to allow the screw fixation of the shock tower.

In general, a structural part 10 according to the invention comprises a frame 12 and a body 14 that is integral with the frame 12.

The frame 12 adopts the general shape of the structural part 10 and serves as a skeleton for the structural part 10.

The frame 12 is formed by at least two branches 16 connected to one another in at least one connecting zone 18.

For example, the connecting zone 18 is an area in which a first branch 16 is superimposed on, and secured to, a second branch 16. Alternatively, the connection zone 18 may be in the form of an insert, for example a metal part, on which the two branches 16 may be fixed.

The branches 16 may be flat or shaped. The branches 16 may have, for example, a polygonal shape. The branches 16 may have the same thickness or may have different thicknesses as a function of the stresses to which they are intended to be subjected.

The branches 16 are separated from each other by at least one gap 20 in a zone of least stress. By "least stress" is meant that the structural part 10 is intended to be subjected to lower stresses in the gap 20 than in the branches 16 of the frame 12.

For example, with respect to the frame 12, i.e. in the zones of high stress, the stresses are between 50% and 150% greater than the stresses in the zones of least stress.

The structural part 10 is intended to undergo stresses in a mean direction determined according to the function of the structural part 10 and its location in the body in white 8.

In the example shown in FIG. 2, where the structural part 10 forms a shock tower, the structural part 10 is intended to undergo stresses oriented in a direction from the front to the rear of the vehicle and according to the direction of elevation of the vehicle.

The structural part 10 according to the example comprises two branches 16A, 16B, wherein each comprises a first portion extending substantially parallel to the axis of the shock tower and a second portion extending substantially parallel to the front-rear direction of the vehicle. Another branch 16C extends substantially parallel to the front-rear direction of the vehicle.

The structural part 10 preferably comprises at least one fourth branch 16D extending in the gap 20 delimited by the branches 16A, 16B, so that the fourth branch 16D connects the two other branches 16A, 16B and substantially forms right angles with the branches 16A, 16B. This fourth branch 16D makes it possible to improve the mechanical integrity of the frame 12.

In the example shown in FIG. 2, the branches 16A and 16C have an irregular polygon shape, while the branches 16B and 16D have a band shape.

The frame 12 is made of a first composite material comprising a plurality of continuous fibers impregnated with a first polymeric material.

The term "continuous fibers" is understood to mean fibers whose length is greater than 50 mm, and preferably have a length close to, or substantially equal to, the dimensions of the branch 16 in the direction of length and/or width. The continuous fibers are, for example, chosen from mineral, vegetable, synthetic and artificial fibers, and mixtures thereof.

The mineral fibers are, for example, chosen from glass fibers, carbon fibers, basalt fibers and mixtures thereof.

Vegetable fibers are, for example, fibers extracted from plants. Preferably, the vegetable fibers are chosen from flax, sisal, jute, hemp and kenaf fibers, and mixtures thereof.

The artificial fibers are, for example, chosen from regenerated cellulose fibers, such as viscose.

The synthetic fibers are formed from petroleum derivatives or molecules derived from green chemistry, for example polyolefin fibers such as polyethylene fibers and/or polypropylene, polyester, polyamide, and mixtures thereof.

Advantageously, the continuous fibers are glass fibers. These fibers have a very good mechanical strength, while being easy and inexpensive to produce.

Advantageously, the frame 12 is composed of at least 20% by volume of continuous fibers. Preferably, the frame 12 is composed of at least 40% by volume of continuous fibers. Such proportions ensure good mechanical strength of the frame 12.

According to one embodiment, the majority of the continuous fibers are arranged to extend in a direction defining an angle substantially less than or equal to 10° with the mean direction of the stresses that the structural part 10 is intended to undergo. Advantageously, at least 80% of the continuous fibers extend in a direction defining an angle substantially less than or equal to 10° with the mean direction. Preferably, at least 80% of the continuous fibers are substantially parallel to the mean direction. This orientation of the continuous fibers ensures good transmission and good distribution of the loads along the branches 16 of the frame 12.

In the example illustrated in FIG. 2, the structural part 10 is intended to undergo constraints mainly directed in the direction of elevation of the vehicle.

The first polymeric material is selected from thermoplastic materials, thermosetting materials, and mixtures thereof. Preferably, the first polymeric material is selected from the group consisting of polycaprolactam PA 6, polyhexamethylene adipamide PA 6.6, polyethylene terephthalate PET, unsaturated polyesters and polyepoxides.

According to one embodiment, the frame 12 comprises fixing regions 28. For example, these fixing regions 28 may be openings allowing the fixing of another structural part, such as a fixing support 30, on the first structural part 10. The fixing regions 28 may be, for example, screw holes.

The fixing regions 28 are intended to withstand significant stresses. For example, the fixing regions 28 are designed to withstand stresses greater than 200 MPa, including stresses substantially equal to 300 MPa.

The orientation of the continuous fibers in the mean direction of the stresses makes it possible to transfer the mechanical stresses between zones of high stress and the fixing regions 28. The frame 12 thus allows the structural part 10 to withstand tensile stresses greater than $15.10^3$ N, advantageously greater than $50.10^3$ N.

The body 14 completes the general shape of the structural part 10 and defines the complete envelope of the structural part 10.

The body 14 extends in the gap 20 and connects at least two branches 16 in a zone of least stress.

The body 14 is integral with the branches 16, i.e. the body 14 and the frame 12 are integrally formed.

Advantageously, the body 14 extends as a continuance of at least a portion of the frame 12, i.e. the body 14 and the frame 12 define between them an essentially continuous, substantially flat and/or curved surface in a three-dimensional form.

According to a particular embodiment, the body 14 covers at least a portion of a branch 16 so that several gaps 20 are also connected to each other by the body 14. For example, the body 14 covers a face of a branch 16 and extends between two gaps 20 separated from each other by the branch 16.

The body 14 is made of a second material that is different from the first composite material. The second material comprises at least one second polymeric material. Advantageously, the first and second polymeric materials are of the same nature in order to allow adhesion compatibility of the two materials. For example, the first polymeric material and the second polymeric material may be identical.

For example, the second polymeric material may be selected from thermoplastic materials, thermosetting materials, and mixtures thereof. Preferably, the second polymeric material is selected from the group consisting of polycaprolactam PA 6, polyhexamethylene adipamide PA 6.6, polyethylene terephthalate PET, unsaturated polyesters, polyepoxides and acrylic resins.

Advantageously, the second material used for the body 14 is less expensive than the first composite material used for the frame 12. It is thus possible to obtain a structural part 10 offering both good resistance to mechanical stresses thanks to the frame 12, while maintaining costs, thanks to the body 14, that are compatible with large-scale industrial production. Such a structural part 10 may be obtained because the body 14 extends in a zone of less stress and may therefore be made of a material having less crucial mechanical characteristics than those of the material of which the frame 12 is made and which will be subject to significant stresses when the vehicle is used.

According to one embodiment, the body 14 is made of a second polymeric material reinforced by continuous fibers with random orientation.

According to one embodiment, the body 14 is made of a second polymeric material reinforced with short or long fibers.

"Short fibers" is understood to mean fibers whose length is between 0.1 mm and 1 mm, while "long fibers" is understood to mean fibers whose length is greater than 1 mm and less than or equal to 60 mm.

Advantageously, the body 14 is made of a second polymeric material reinforced with cut fibers.

According to one embodiment, the body 14 comprises fixing regions 34. These fixing regions 34 are designed to withstand lower stresses than the fixing regions 28 of the frame 12.

According to one embodiment, the part 10 comprises at least one insert 36 overmolded on the body 14 and/or on the branches 16. Advantageously, the insert 36 may be made of a metallic material or a composite material.

The insert 36 is advantageously located in the regions of high stress and/or near the fixing regions 28, 34 in order to ensure a better local distribution of the stresses, and to avoid creep, or for assembly reasons, such as, for example, allowing spot welding. For this purpose, the insert 36 may be metallic, for example, in order to allow it to be welded to its surroundings, such as to another structural part made of metal, or to make it possible to fix a metal part to the structural part 10 by welding with the insert 36.

The insert 36 is intended to withstand significant stresses. For example, the insert 36 is intended to withstand stresses equal to 300 MPa.

According to the embodiment shown in FIG. 2, an insert 36 is overmolded on the connecting zone 18 connecting three branches 16 between them. Alternatively, the insert 36 may form the connection zone 18, while the branches 16 are fixed on the insert 36, for example by overmolding.

According to one embodiment, the structural part 10 comprises reinforcing ribs 38 projecting from the frame 12 and/or the body 14. Such reinforcing ribs 38 allow the structural part 10 to withstand more significant local stresses than those supported by regions without reinforcing ribs 38.

The reinforcing ribs 38 are advantageously made in the same second material as the body 14 in order to maintain reduced manufacturing cost.

A method of manufacturing the first structural part 10 shown in FIG. 2 will now be described.

The first structural part 10 is intended to undergo stress in a mean direction.

At least two branches 16 are made of a first composite material comprising a plurality of continuous fibers impregnated with a polymeric material.

The branches 16 may be formed, for example, integrally or overmolded on a metal connecting piece. The branches 16 are arranged so that they form a frame 12 comprising at least two branches 16 connected to one another in at least one connecting zone 18 and separated from each other by a gap 20 that is intended to undergo less stress. The majority of the continuous fibers are arranged in such a way as to define an angle substantially less than or equal to 10° with the mean direction of stress.

The fixing regions 28 are advantageously manufactured on the frame 12.

Then, a body 14 is formed inside the gap 20 located between at least two branches 16, so that the body 14 is secured to the frame 12 and extends into the gap 20. The body 14 connects at least two branches 16.

Advantageously, the body 14 is formed by injecting the second material in the gap 20 located between at least two branches 16. The frame 12 is, for example, disposed in the mold cavity of an injection mold, wherein the cavity has the shape of the structural part 10 to be produced and the body 14 is injected into the molding cavity in such a way as to be formed integrally with the frame 12.

According to one particular embodiment, the body 14 covers at least a portion of a branch 16.

According to one embodiment, fixing regions 34 are molded with the body 14.

According to one particular embodiment, at least one insert 36 is overmolded on the body 14 and/or on the branches 16.

According to a particular embodiment, reinforcing ribs 38 are formed protruding from the frame 12 and/or the body 14 on at least one of the faces of the structural part 10.

According to one embodiment, the structural part 10 is manufactured in a one-step process. In this case, the first composite material consists of a prepreg. In the case of a first thermoplastic polymeric material, the first composite material is heated and deposited in the cold mold. In the case of a first thermosetting polymeric material, the first composite material is placed cold in the hot mold. In both cases, the mold is then closed and the second material is injected into the mold.

According to a second embodiment, the structural part 10 is made using the injection molding technique of a low-viscosity resin, also known as "resin transfer molding". The fibrous materials of the branches 16 and the body 14 are arranged in the air gap of a mold. The mold is usually kept at a constant temperature as a function of the resin. It may also be regulated according to a predefined temperature curve. The resin is injected into the closed mold. Advantageously, at least one insert 36 is placed inside the mold and is directly overmolded on the body 14 and/or on the branches 16 during this injection step.

According to a third embodiment, the structural part 10 is made by a compression molding process in the case of thermosetting materials, also referred to as an SMC (Sheet Molding Compound) method. In this method, the frame 12 is made of a prepreg comprising continuous fibers, while the body 14 is made of a prepreg comprising fibers arranged randomly. The frame 12 and the body 14 are deposited in the mold. The mold is then closed with a pressure of between 10 and 20 Mpa, and heated to a temperature of about 150° C. The parts 10 are ejected after a time of 60 to 120 seconds.

According to a fourth embodiment, the structural part 10 is made by a compression molding process, in the case of thermoplastic materials, also called the GMT (Glass Mat Thermoplastics) method. In this method, the frame 12 is made of a prepreg comprising continuous fibers, while the body 14 is made of a prepreg comprising fibers arranged randomly. The frame 12 and the body 14 are preheated in an oven above the melting temperature of the thermoplastic material, for example at a temperature equal to 300° C. for a PA 6.6. Once heated, the frame 12 and the body 14 are deposited in a closed mold with a pressure of 10 to 20 MPa. The mold is maintained at a temperature of about 150° C. The parts 10 are ejected after a time of 60 to 120 seconds.

Figure 3:
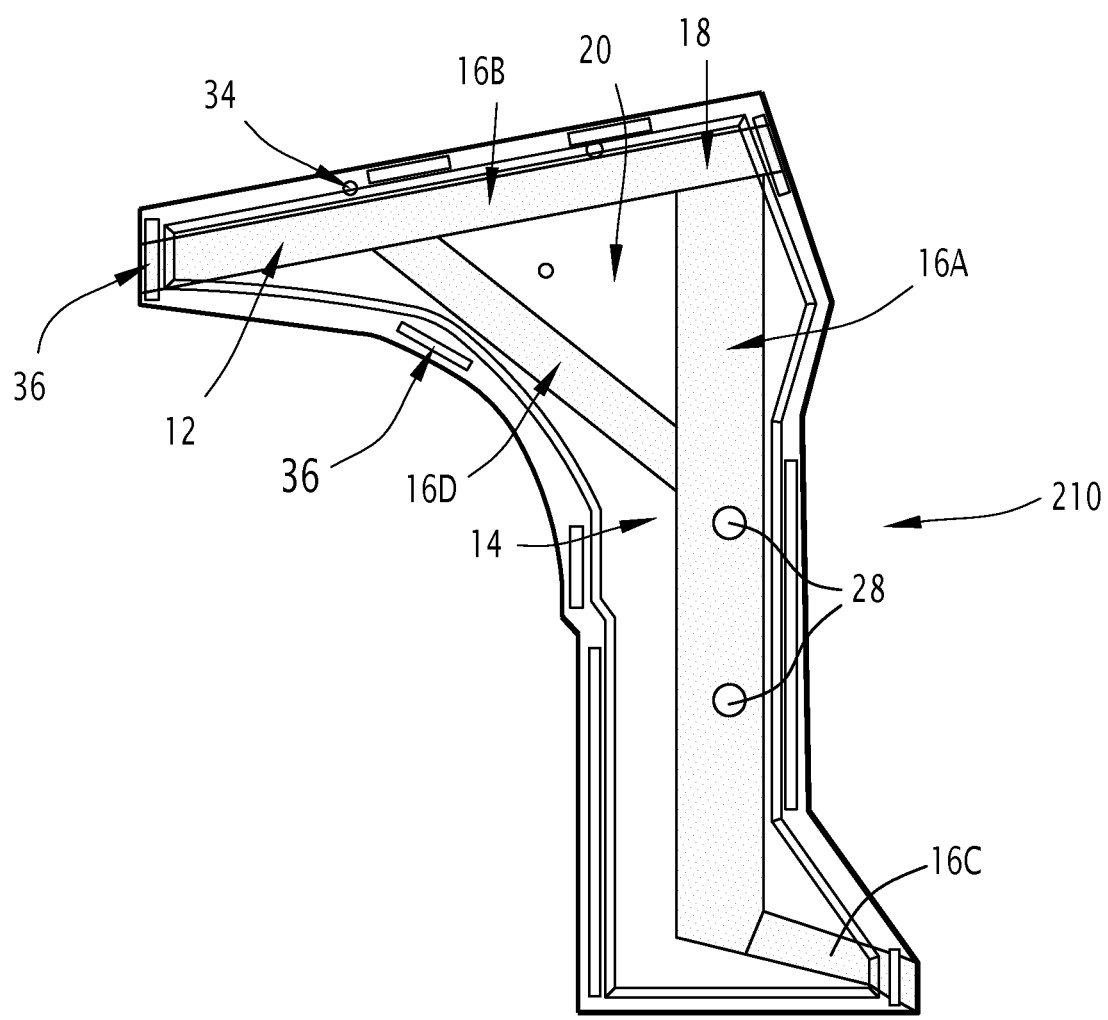
FIG. 3 shows a schematic view of a second structural part of a vehicle body in white according to the invention.

Alternatively, a second structural part 210 according to the invention is shown schematically in FIGS. 1 and 3.

In this example, the second structural part 210 forms a front pillar, also referred to as an "A-Pillar", which is intended to serve as a support for the windshield and an opening of a vehicle.

The second structural part 210 comprises a first branch 16A extending substantially in the direction in which the structural part 210 extends, for example a direction of elevation. The first branch 16A comprises the fixing regions 28.

The first branch 16A is connected at each of its ends to two branches 16B and 16C forming an angle with the first branch 16A. The three branches 16A, 16B and 16C take up the general shape of the part 210.

Preferably, the first branch 16A is also connected to the branch 16B with a fourth branch 16D extending in the gap 20, so that the frame 12 has substantially the form of a square. This arrangement of the branches 16A, 16B and 16D reinforces the mechanical integrity of the structural part 210 and allows better distribution of the stresses within the structural part 210. The structural part 210 advantageously comprises a plurality of inserts 36 located at the edges of the part 210. These inserts 36 are mainly used for assembly with the surrounding metal parts by methods adapted to the metal.

Figure 4:
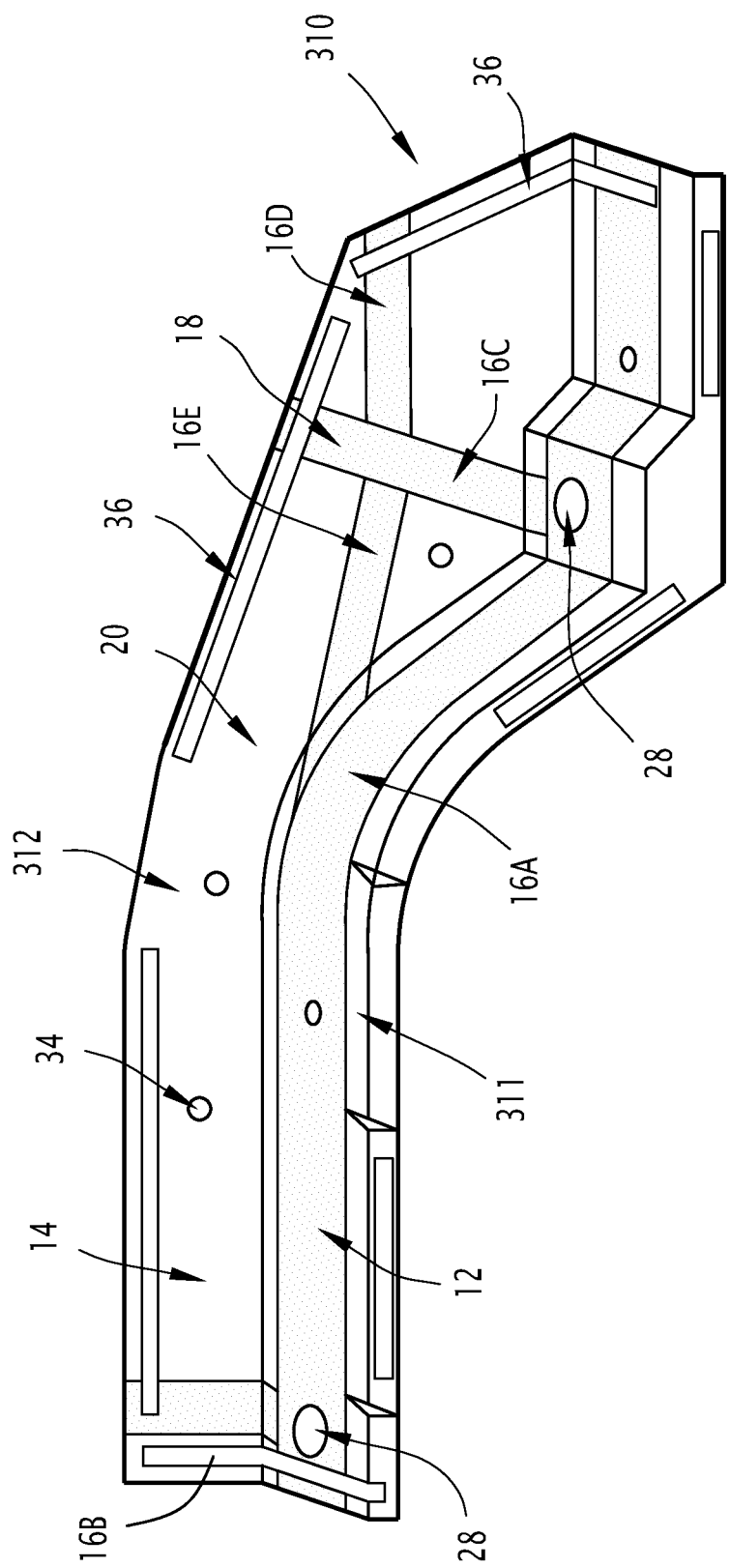
FIG. 4 shows a schematic view of a third structural part of a vehicle body in white according to the invention.

Alternatively, a third structural part 310 according to the invention is shown schematically in FIGS. 1 and 4.

In this example, the third structural part 310 forms a rear rail, also referred to as a "rail rear node" that is designed to absorb shocks at the rear of the vehicle.

The third structural part 310 is intended to undergo stresses in the front-rear direction of the vehicle.

The third structural part 310 has a lower face 311 extending substantially in the front-rear direction of the vehicle, and at least one side face 312 extending substantially in the direction of elevation. The lower face has substantially the profile of a staircase.

The branches 16 take up the general shape of the part 310.

A main branch 16A extends along the lower face 311 in the front-rear direction of the vehicle. Two branches 16B, 16C extend along the side face 312 substantially in the direction of elevation.

Two branches 16D and 16E extend along the side face 312 substantially in the front-rear direction of the vehicle. Alternatively, a single branch may extend along the side face 312 substantially in the front-rear direction of the vehicle.

The branches 16B, 16C, 16D, 16E extend along the side face 312 and thus enhance the mechanical strength of the structural part relative to the lateral stresses of the vehicle.

Fixing regions 28 are located at the connecting zones 18 connecting the main branch 16A to the lateral branches 16B and 16C.

The structural part 310 advantageously comprises a plurality of inserts 36 located at the edges of the part 310. These inserts 36 serve as frames at the edges and reduce damage to the structural parts 310 over time.

Alternatively, the invention may also be applied to a fourth structural part 410 shown schematically in FIG. 1.

In this example, the fourth structural part 410 forms the top of a central pillar, also referred to as a "B-Pillar".

Alternatively, the structural part according to the invention may also be a convertible roof frame, a crossbeam or any other part of the body in white 8 of a vehicle intended to be subjected to mechanical stresses.

The structural part according to the invention makes it possible to benefit from the mechanical properties of the continuous fibers, while maintaining costs that are compatible with large-scale production thanks to the use of a less expensive material in areas subjected to less mechanical stress. The combination of a high performance continuous fibrous material with another low cost, low performance material provides lightweight structural parts.

Alternatively, a shock tower assembly 510 comprising a shock tower body 524 formed by a structural part according to the invention as described above is shown schematically in FIG. 5.

Figure 5:
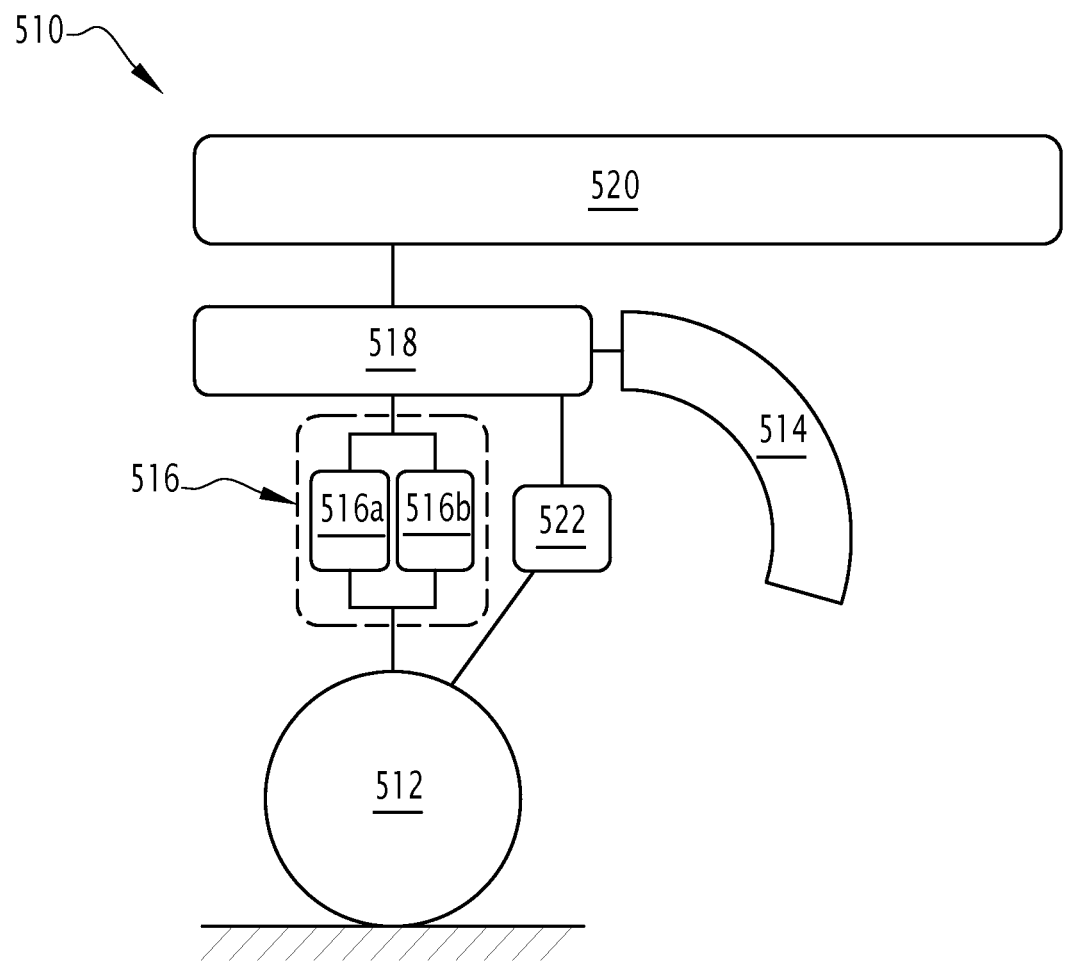
FIG. 5 shows a schematic representation of a suspension assembly for a vehicle wheel.

FIG. 5 provides a schematic representation of the suspension assembly 510 for a vehicle wheel 512 that is positioned within a wheel cover 514. A strut 516, made of a spring 516a and a shock absorber 516b, is used to dampen road load inputs from the wheel 512 to facilitate vehicle control and improve passenger comfort. The shock tower 518 is used to facilitate mounting of the strut 516 to a fixed vehicle structure 520, such as a frame, chassis, body, etc. The shock tower 518 is also used to facilitate connection of the strut 516 to a suspension control arm 522 associated with the wheel 512. A wheel cover 514 is usually connected to strut 516 by mechanical fasteners or spot welding.

Figure 6:
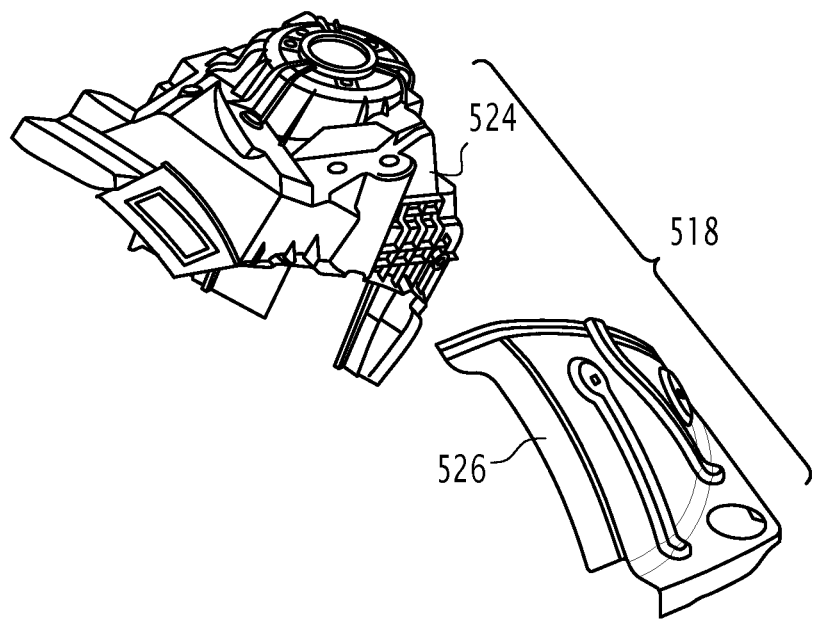
FIG. 6 shows an exploded view of a composite shock tower and a composite wheel cover as used in the suspension assembly of FIG. 5.
Figure 7:
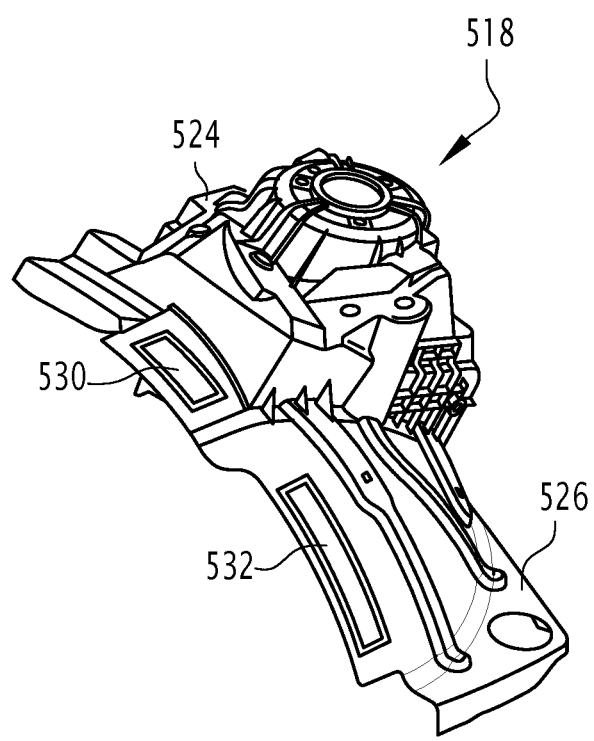
FIG. 7 shows a perspective view of a composite shock tower and wheel cover integrally formed as a single piece component.
Figure 8:
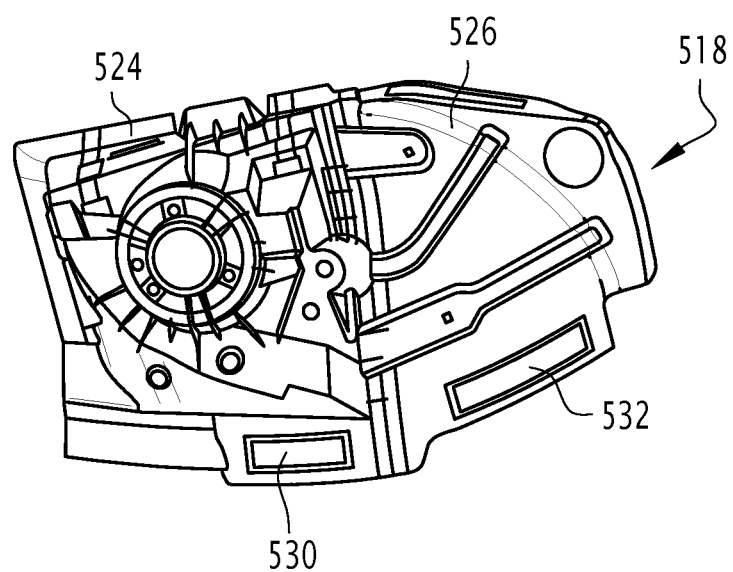
FIG. 8 shows a top view of the composite shock tower and wheel cover of FIG. 7.
Figure 9:
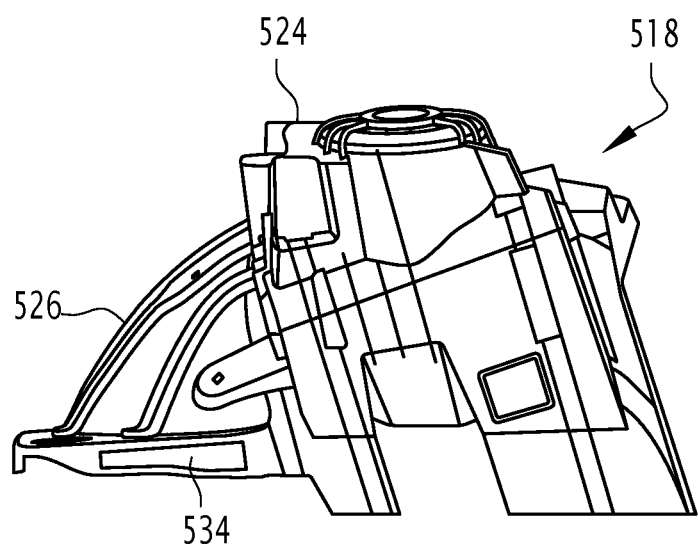
FIG. 9 shows a side view of the composite shock tower and wheel cover of FIG. 7.

As shown in FIG. 6, the shock tower 518 includes a shock tower body 524 and a wheel cover 526. The shock tower body 524 is formed by a structural part according to the invention, as described in relation to FIGS. 1 to 4.

The shock tower body 524 and the wheel cover 526 are integrally formed together as a single piece component as shown in FIGS. 7-10. The shock tower 518 comprises an integrated polymer composite hybrid shock tower. Additional components such as brackets, sleeves, washers, nuts, bolts, screws, etc. for example, can be overmolded into the shock tower 518 to further reduce cost and provide the hybrid configuration. This will be discussed in greater detail below.

As shown in FIGS. 7-10, shock tower body 524 and wheel cover 526 are both made in a single process, which results in an integral, single piece component. In one example, an injection molding process is used to achieve the integration, which will be discussed in greater detail below. In one example, the shock tower body 524 has thickness varying from 2 mm to 8 mm depending on the design requirements for a specific vehicle application. The thickness of the wheel cover 526 can be similar to that of the shock tower body 524 or can also be varied as needed for specific applications.

In one example, the shock tower 518 includes at least one reinforcement member that is integrated into the shock tower body 524. In one example, the reinforcement member comprises one or more brackets or plates 530, 532, 534 that are molded with the shock tower body 524 as part of the single piece component. In one example, the plates 530, 532, 534 are comprised of a metal material and are overmolded at a first overmold interface 536 (FIGS. 10 and 23) to form the hybrid configuration. In one example, the metal material comprises sheet metal or the same metal material as used for an associated body-in-white (BIW), which corresponds to the fixed vehicle structure 520 as shown in FIG. 5 for example. In one example, the plates 530, 532, 534 facilitate attachment of the shock tower 518 to the BIW.

Figure 10:
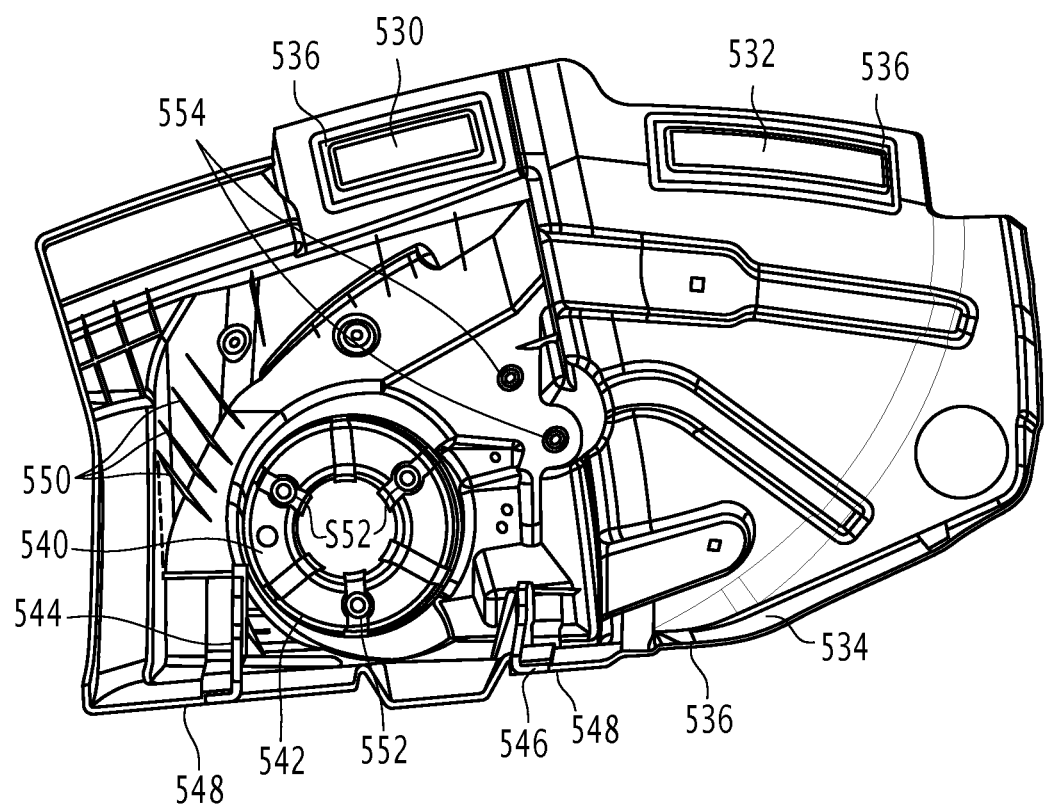
FIG. 10 shows a bottom view of the composite shock tower and wheel cover of FIG. 7.
Figure 14:
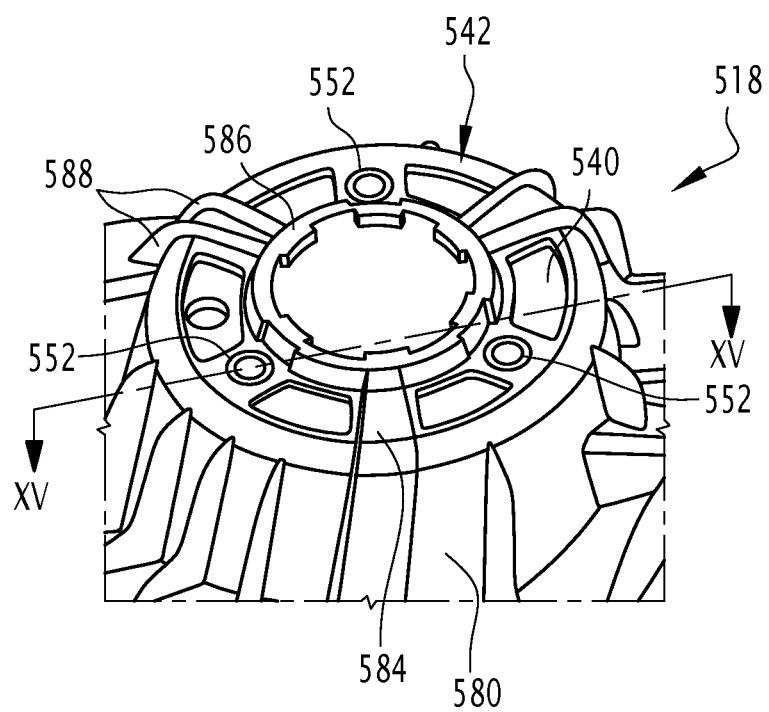
FIG. 14 shows a perspective view of the components of FIG. 13 molded together as the single piece component.
Figure 15:
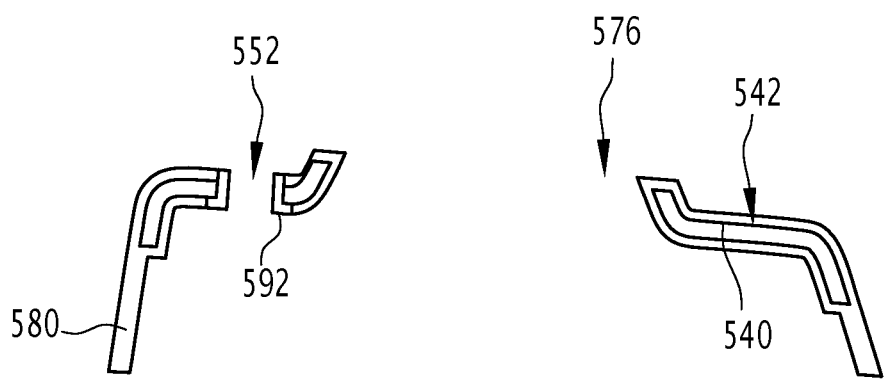
FIG. 15 shows a section view as identified in FIG. 14.

In another example, the at least one reinforcement member comprises a shock tower cap 540 that is made of continuous fiber reinforced thermoplastic (CFRP) and overmolded with the shock tower body 524 at a second mold interface 542 (FIGS. 10 and 14-15). In another example, the at least one reinforcement member includes front 544 and rear 546 mount flanges that are made of CFRP and overmolded with the shock tower body 524 at a third mold interface 548 (FIGS. 10, 17, 18, 20 and 21). The inclusion of the overmolded shock tower cap 540 and the front/rear mount flanges 544, 546 provides increased mechanical properties in desired areas, which in the examples shown, respectively interface with the strut 516 and the suspension control arm 522.

Also shown in FIG. 10 is a plurality of ribs 550 formed in a specified ribbing pattern to increases the stiffness of the shock tower 518 in desired areas. Various forms of ribbing patterns such as square, rectangular, X-shape, honey comb or circular can be employed in the shock tower body 524 or wheel cover 526 to stiffen the shock tower 518. It is possible to form the rib patterns in any desired number/pattern via the injection molding process.

One or more mounting holes 552 may also formed in the shock tower cap 540 and shock tower body 524 to provide a mount interface for the strut 516. Additionally, the shock tower 518 may include one or more additional mounting holes 554 that provide an interface for assembly of the shock tower 518 with other elements of the vehicle.

Figure 11:
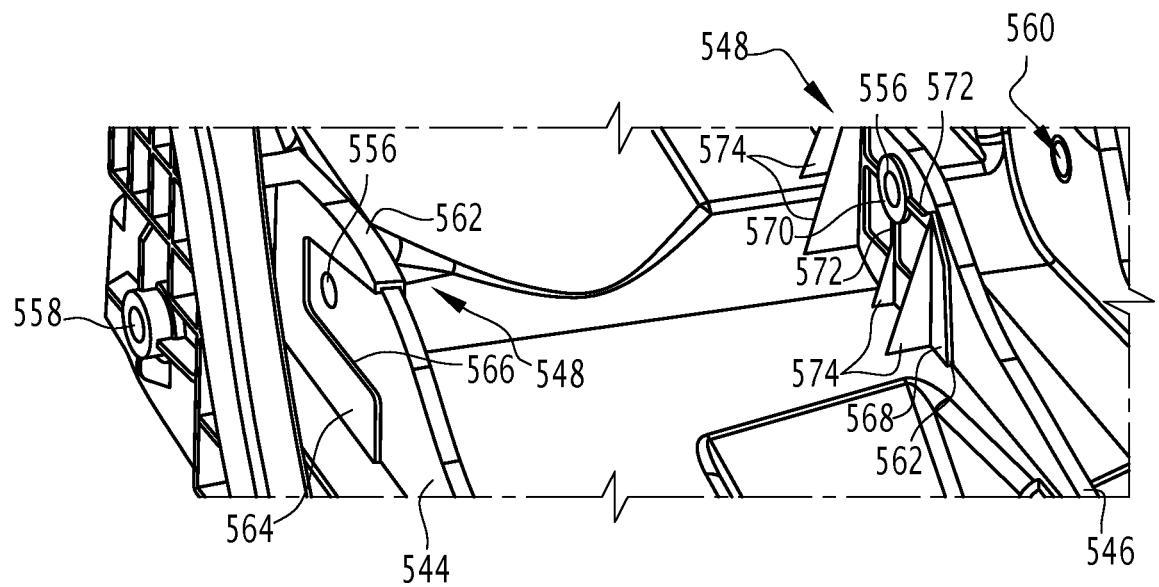
FIG. 11 shows an enlarged view of reinforcement members overmolded into the shock tower body for attachment to a suspension control arm.
Figure 12:
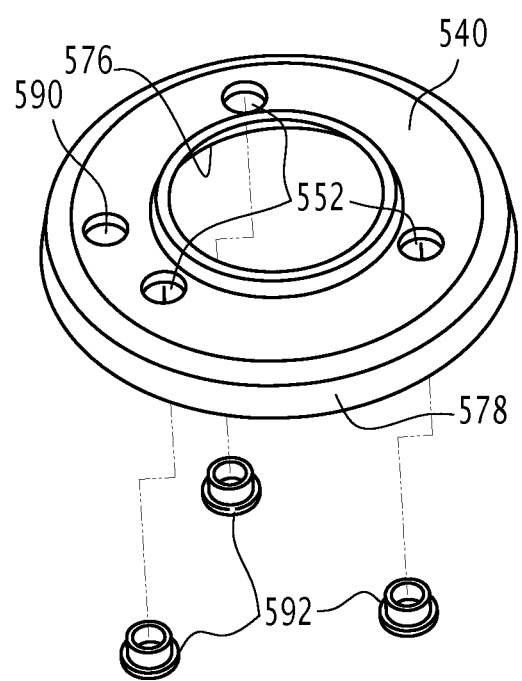
FIG. 12 shows an exploded view of a shock tower cap and mount features to be molded with the shock tower cap.
Figure 13:
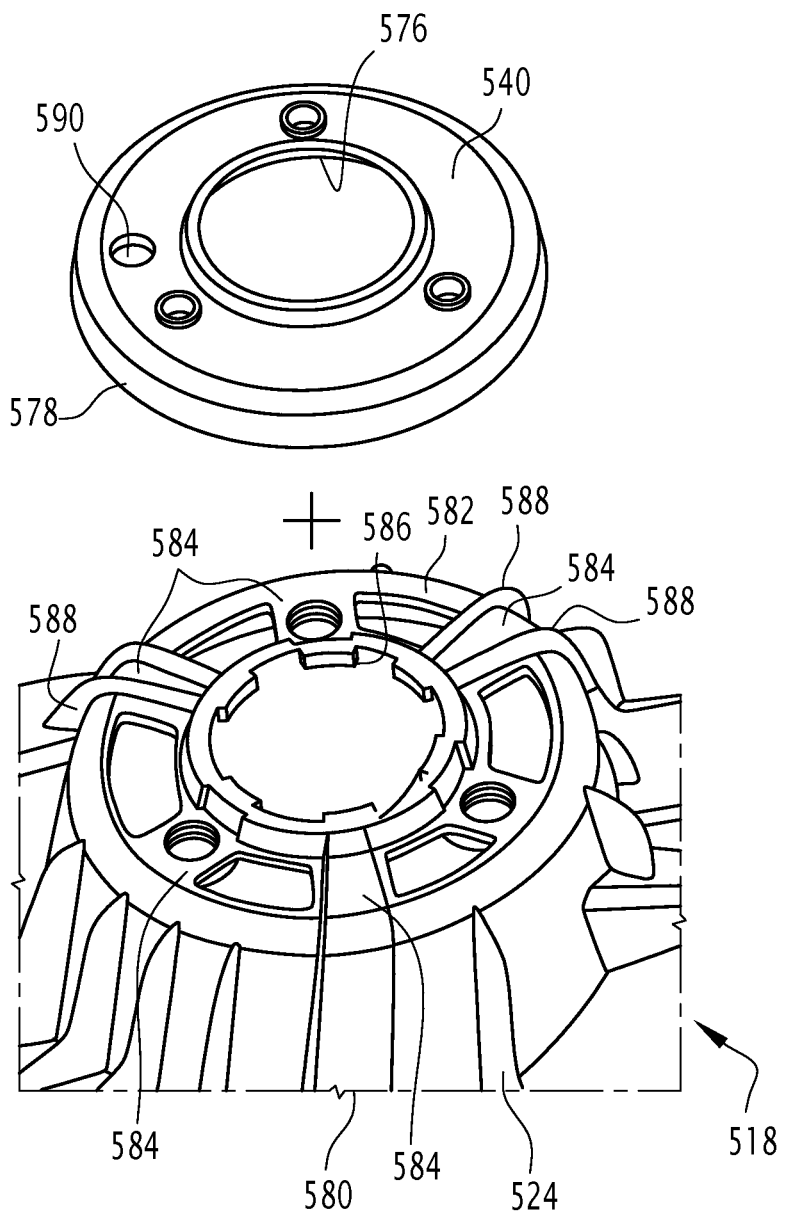
FIG. 13 shows an exploded view of the cap of FIG. 12 and a cap mount area of the shock tower body.

FIG. 11 shows a magnified view of an interface of the front 544 and rear 546 mount flanges that are overmolded with the shock tower body 524 and that cooperate with the suspension control arm 522. The control arm 522 is attached with fasteners that pass through openings 556 where one fastener tightens into a corresponding opening 558 on the left of FIG. 11 and another fastener tightens into a corresponding opening 560 on the right. The shock tower body 524 includes slot or sleeve portions 562 that receive respective ends of the front 544 and rear 546 mount flanges. These sleeve portions 562 include walls that are overmolded to engage opposing sides of the front 544 and rear 546 mount flanges at the overmold interface 548.

An outer facing wall 564 includes a slot or opening 566 to allow the fasteners to respectively pass through toward the openings 558, 560. An inner facing wall 568 includes a flat area 570 that provides a seat for a head of the fastener and one or more arms 572 that attach the flat area 570 to the wall 568. Additional strut or rib structures 574 are present around the overmolded sleeve portions 562 to transfer the loads to the main shock tower body 524 and to increase the mechanical properties of the attachment interface.

FIGS. 12-15 illustrate the shock tower cap 540, which transfers the load from the strut 516 to the shock tower 518 via direct contact and fasteners that pass through the openings 552. In one example, the cap 540 can be made of either CFRP or sheet metal, thermoformed or stamped before injection overmolding. Optionally, the cap 540 can be directly formed with a one shot process (forming and injecting). The cap 540 has ring shaped body with an opening 576 at a center of the cap 540 to receive a head of the strut 516 and/or any sensor or electronic device wire harness associated therewith. In one example, the cap 540 includes an outer flange 578 that extends about an outer periphery of the ring shaped body in a direction toward the shock tower body 524 to increase the stiffness and transfer the load to a shock tower vertical wall 580.

The shock tower vertical wall 580 extends upwardly to an upper cap portion that is molded around the cap 540. In one example, the upper cap portion area includes a peripheral recess 582 to receive an outer peripheral edge of the cap 540, and arms 584 that are molded around the cap 540. The arms 584 extend between the vertical wall 580 and a center ring 586 that includes an opening that aligns with the center opening 576 in the cap 540.

A plurality of ribs 588 are additionally provided at the top of the shock tower 518 to increase the strength and stiffness as needed. In one example, the strut 516 is mounted directly to the cap 540 and the holes 552 comprise three radially symmetrical holes that are drilled through the cap 540 to allow for the passage of fasteners. An additional hole 90 can be provided for positioning purposes.

In one example, additional mount features such as flanged bushings/compression limiters 592 are overmolded in the holes 552 during the injection molding process to keep metal-to-metal contact and transfer load from the strut 516 to the upper cap of the shock tower body 524. These flanged bushings/compression limiters 592 are required when polymer material is in a sandwiched relationship between a head of the fastener and the assembled strut 516 such that the thickness of the polymer material is not reduced over time due to creeping caused by the continuous force applied.

Figure 16:
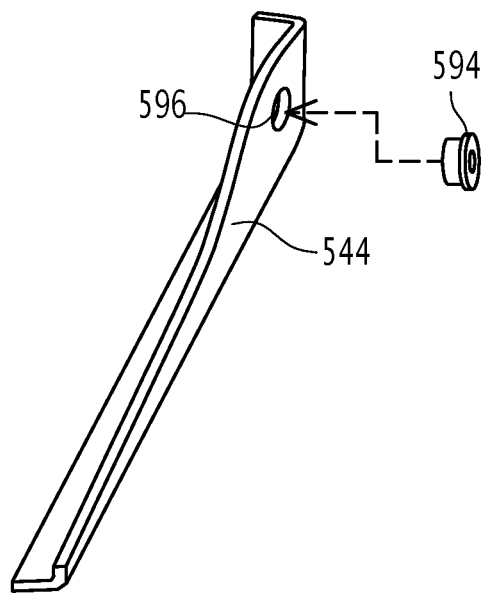
FIG. 16 shows an exploded view of a front mount flange and a mount feature to be molded with the front mount flange.
Figure 17:
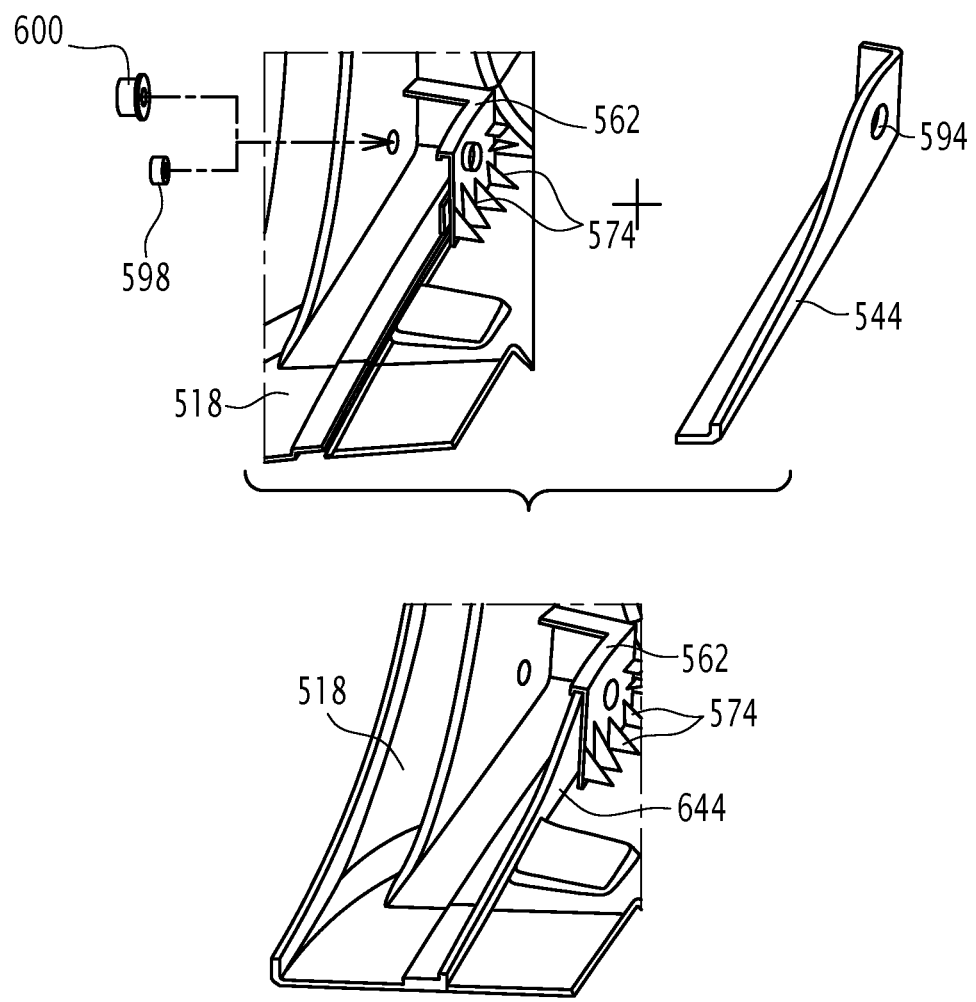
FIG. 17 shows an exploded view of the front mount flange of FIG. 16 and a front flange mount area of the shock tower body that are molded together to form the single piece component.
Figure 18:
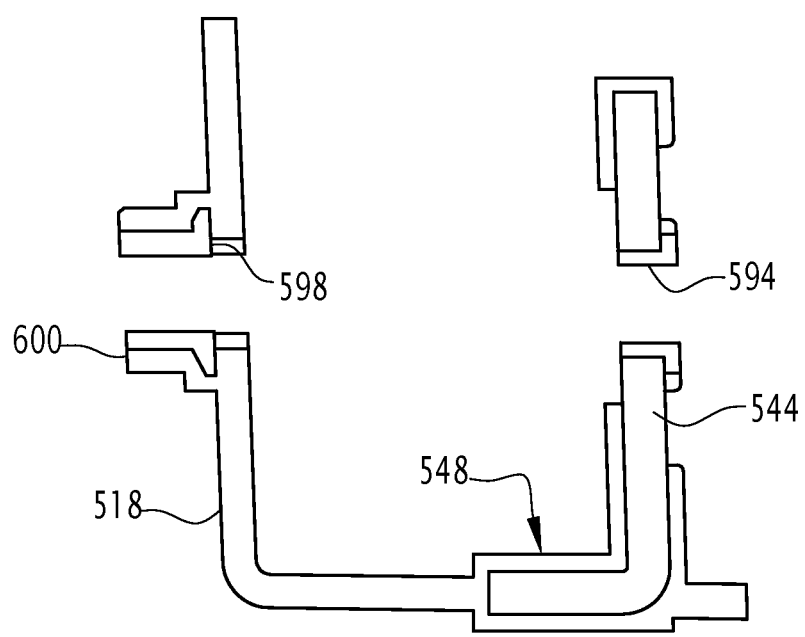
FIG. 18 shows a section view through the structure of FIG. 17.

FIGS. 16-18 show overmolding of the front mounting flange 544 with the shock tower body 524. In one example, the front mounting flange 544 is a separate component that is pre-manufactured prior to the injection molding process by thermoforming of CFRP sheets. The front mounting flange 544 is used to mount the control arm 522 as discussed above. The thickness of the front mounting flange 544 can range from 2 mm to 8 mm, for example, but can be varied depending on vehicle load requirements. In one example, metal bushings/compression limiters 594 are pressed into one or more holes 596 in the front mounting flange 544 to avoid direct contact of CFRP material with metal mounting fasteners for the same reasons of eliminating creep. The front mounting flange 544 is then overmolded during the injection molding process via the sleeve portions 562 as described above. The stiffening ribs 574 can be formed around the front mount flange to reinforce the attachment areas as needed. For the same reason, a metal spacer 598 with a nut 600 can be overmolded in the shock tower body 524 for control arm attachment.

Figure 19:
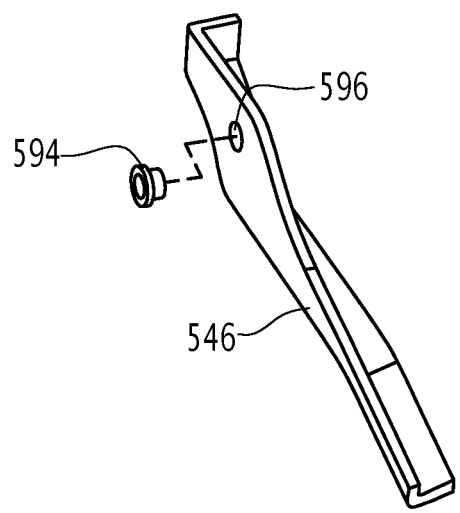
FIG. 19 shows an exploded view of a rear mount flange and a mount feature to be molded with the rear mount flange.
Figure 20:
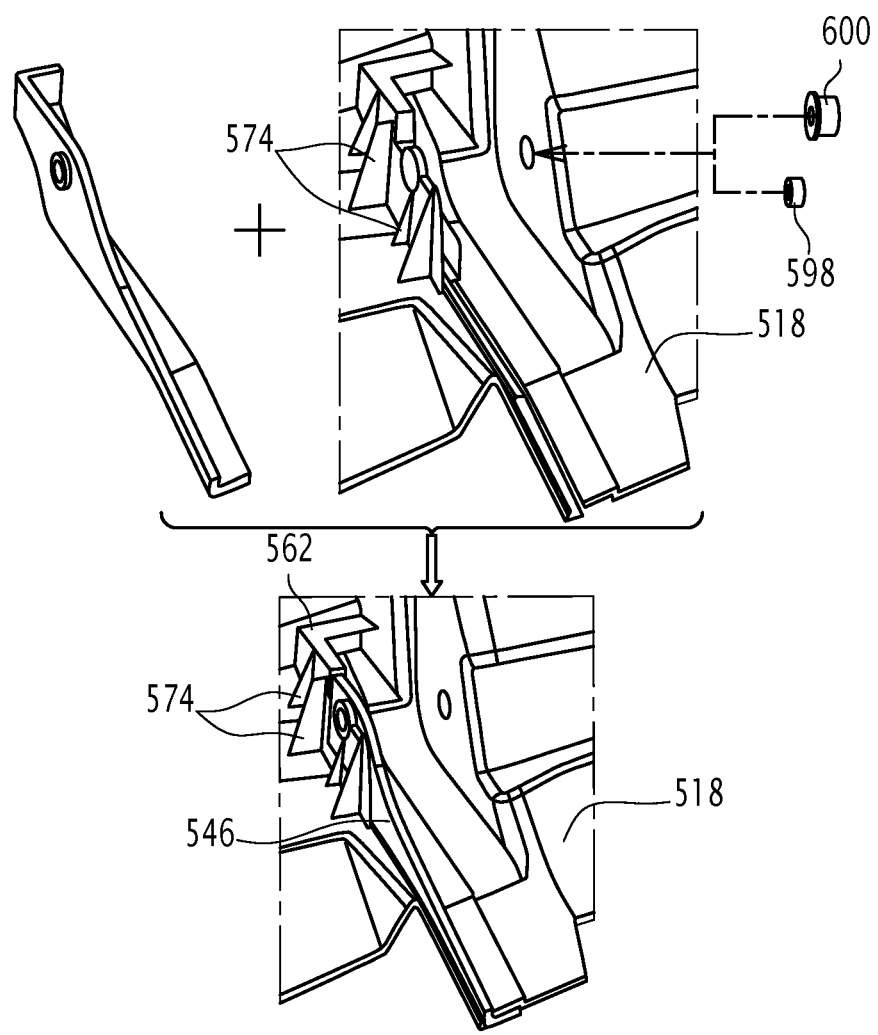
FIG. 20 shows an exploded view of the rear mount flange of FIG. 19 and a rear flange mount area of the shock tower body that are molded together to form the single piece component.
Figure 21:
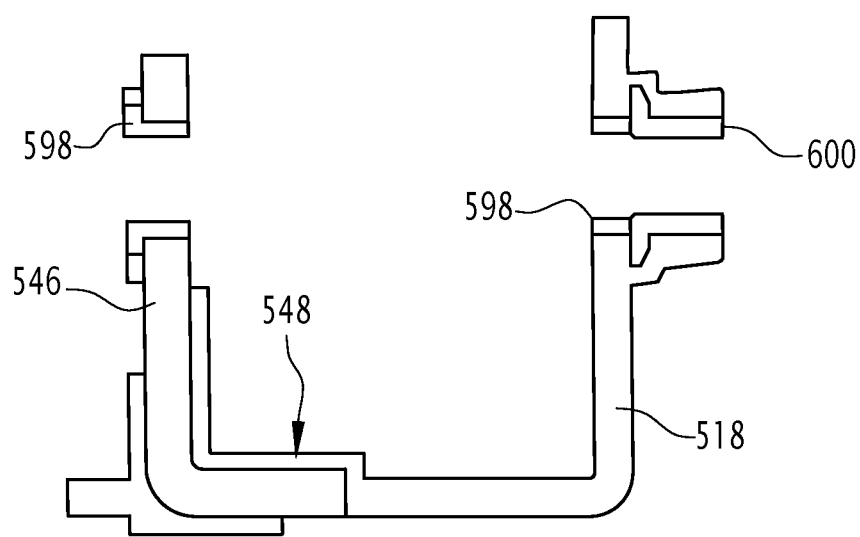
FIG. 21 shows a section view through the structure of FIG. 20.

FIGS. 19-21 show overmolding of the rear mounting flange 546 with the shock tower body 524. In one example, the rear mounting flange 546 is a separate component that is pre-manufactured prior to the injection molding process by thermoforming of CFRP sheets. The rear mounting flange 546 is used to mount the control arm 522 as discussed above. The thickness of the rear mounting flange 546 can range from 2 mm to 8 mm, for example, but can be varied depending on vehicle load requirements. In one example, metal bushings/compression limiters 594 are pressed into one or more holes 596 in the rear mounting flange 546 to avoid direct contact of CFRP material with metal mounting fasteners for the same reasons discussed above. The rear mounting flange 546 is then overmolded during the injection molding process via the sleeve portions 562 as described above. The stiffening ribs 574 can be formed around the rear mount flange to reinforce the attachment areas as needed. For the same reason, a metal spacer 598 with a nut 600 can be overmolded in the shock tower body 524 for control arm attachment.

Figure 22:
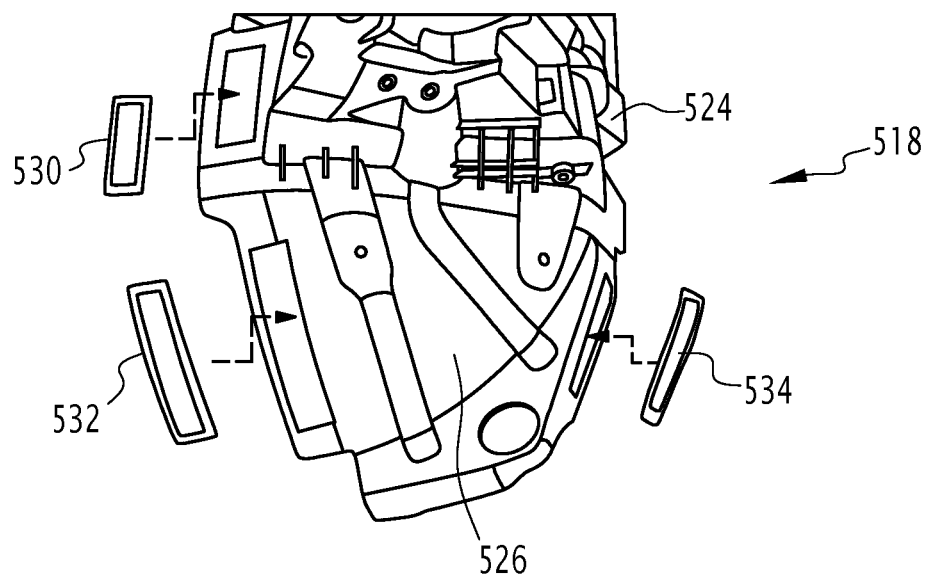
FIG. 22 shows an exploded view of reinforcement members and the shock tower body.
Figure 23:
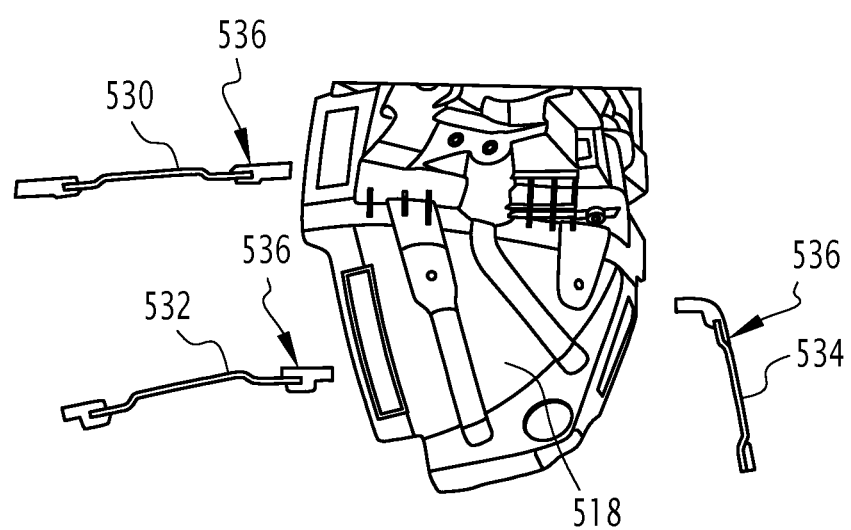
FIG. 23 shows a perspective view of the reinforcement members of FIG. 22 integrally molded with the shock tower to form the single piece component and which further shows overmolded interfaces between the reinforcement members and shock tower body.

FIGS. 22-23 illustrate metal plates 530, 532, 534 overmolded into the shock tower 518 for assembly to the BIW. The plates 530, 532, 534 are used to facilitate the assembly of the shock tower 518 into the vehicle in compliance with existing resistance spot welding and fastener assembly processes. The metal plates 530, 532, 534 are formed to have at least one upper surface and one lower surface which will be in contact with surfaces of upper and lower tools. This is to ensure the positioning of the metal plates 530, 532, 534 and to prevent their movement during injection molding. These metal plates 530, 532, 534 may require surface treatment to avoid galvanic corrosion which is a standard practice for dissimilar material assembly into the BIW.

Figure 24:
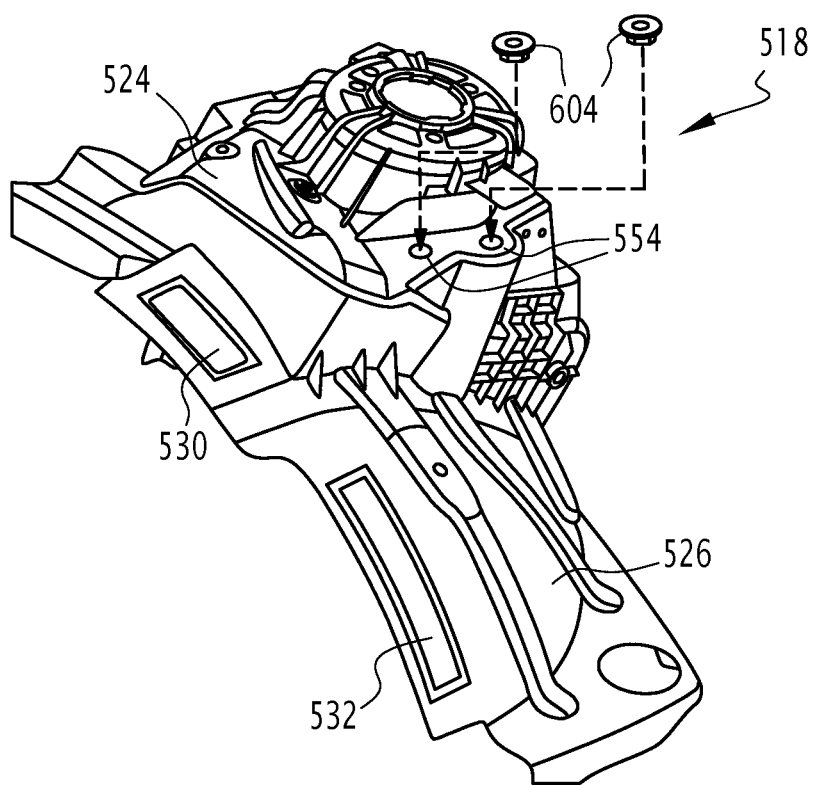
FIG. 24 shows an exploded view of mount members and the shock tower body.
Figure 25:
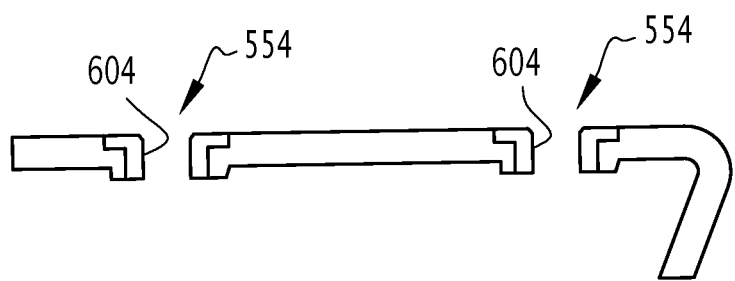
FIG. 25 shows a section view of the mount members as overmolded into the shock tower body of FIG. 24.

FIGS. 24-25 illustrate the overmolding of additional attachment members 604 such as metal nuts for example, with the shock tower 518. These can be used to fasten other metallic parts on the shock tower with fasteners. In one example, all metallic parts are treated with a coating or made of stainless steel to avoid any galvanic corrosion due to the different electrode potential if the polymer composite material contains carbon fibers.

Besides benefitting from the mechanical properties of the continuous fibers and the lower costs of a less expensive material in areas subjected to less mechanical stress described previously, the shock tower assembly 510 according to the invention presents further advantageous aspects.

The integration of the shock tower and wheel cover into a single part provides the benefits of lower part cost, elimination of sub-assembly steps, lower capital investment, and while also avoiding corrosion and part tearing.

The various rib formations, for example long running vertical and horizontal ribs in specified patterns, provide for connection of the shock tower at suspension attachment areas to BIW mount regions effectively reducing the risk of shock tower collapse and failure under load. The ribs can be patched to a large area effectively increasing the local stiffness with minimum use of material. Further, the overmolding of CFRP mount flanges enables the use of high performance material to meet the load requirements caused by the suspension system. Overmolding of the metal plates provides seamless assembly of shock tower to BIW using existing resistance spot welding and fastener assembly processes widely adopted in the automotive industry.

Although preferred embodiments of this invention have been disclosed, a worker of ordinary skill in this art would recognize that certain modifications would come within the scope of this invention. For that reason, the following claims should be studied to determine the true scope and content of this invention.

The invention claimed is:

1. A structural part for a body in white of a vehicle comprising:
   a frame formed by at least two branches connected to one another in at least one connecting zone and separated from each other by at least one gap in a zone of least stress, said frame being made of a first composite material comprising a plurality of continuous fibers impregnated with a first polymeric material, and
   a body attached to the frame extending in said at least one gap and connecting the at least two branches in the zone of least stress, said body being made of a second material that is different from the first composite material and comprising at least a second polymeric material, said body being integral with the at least two branches.

2. The structural part according to claim 1, wherein the frame comprises at least 20% by volume of continuous fibers.

3. The structural part according to claim 1, wherein the structural part is intended to undergo stresses oriented in a mean direction, a majority of continuous fibers being arranged to define an angle substantially less than or equal to 10° with said mean direction.

4. The structural part according to claim 1, wherein the second polymeric material comprises polymeric material reinforced with cut fibers.

5. A shock tower assembly comprising:
   a shock tower body formed by a structural part comprising a frame formed by at least two branches connected to one another in at least one connecting zone and separated from each other by at least one gap in a zone of least stress, said frame being made of a first composite material comprising a plurality of continuous fibers impregnated with a first polymeric material, and
   a body attached to the frame extending in said at least one gap and connecting the at least two branches in the zone of least stress, said body being made of a second material that is different from the first composite material and comprising at least a second polymeric material, said body being integral with the at least two branches; and
   a wheel cover made of a polymer composite material and integrated into the shock tower body to form a single-piece component, and/or at least one reinforcement member integrated into the shock tower body.

6. A shock tower assembly according to claim 5 wherein the at least one reinforcement member is comprised of at least one of a metal and a continuous fiber reinforced polymer composite material.

7. The shock tower assembly according to claim 5 wherein the at least one reinforcement member comprises at least one metal plate or bracket and/or at least one mount structure comprised of continuous fiber reinforced polymer composite material.

8. The shock tower assembly according to claim 7 wherein the at least one mount structure comprises a shock tower cap configured to receive a strut component and/or a suspension control arm mount flange.

9. The shock tower assembly according to claim 5, wherein the at least one reinforcement member comprises at least one metal plate and at least one mount structure comprised of continuous fiber reinforced polymer composite material, the shock tower assembly further including a first overmold interface between the shock tower body and the at least one metal plate and a second overmold interface between the at least one mount structure and the shock tower body.

10. The shock tower assembly according to claim 9 wherein the at least one metal plate is integrated into the shock tower body at the first overmold interface and wherein the at least one mount structure comprised of the continuous fiber reinforced polymer composite material is integrated into the shock tower body at the second overmold interface.

11. The shock tower assembly according to claim 9 including a third overmold interface that integrates at least one of a nut, fastener, and sleeve into the shock tower body.

12. A method for manufacturing a structural part for a body in white of a vehicle comprising the following steps:
 providing a frame formed by at least two branches connected to each other in at least one connecting zone and separated from each other by at least one gap in a zone of least stress, said frame being made of a first composite material comprising a plurality of continuous fibers impregnated with a first polymeric material, and
 forming a body attached to the frame extending in said at least one gap and connecting the at least two branches in the zone of least stress, the body being made of a second material that is different from the first material and comprising at least a second polymeric material, said body being integral with the at least two branches.

13. The method according to claim 12, wherein the body is formed by injecting the second material into said at least one gap.

14. A method of forming a shock tower comprising:
 molding a shock tower body forming a structural part manufactured by providing a frame formed by at least two branches connected to each other in at least one connecting zone and separated from each other by at least one gap in a zone of least stress, said frame being made of a first composite material comprising a plurality of continuous fibers impregnated with a first polymeric material, and
 forming a body attached to the frame extending in said at least one gap and connecting the at least two branches in the zone of least stress, the body being made of a second material that is different from the first material and comprising at least a second polymeric material, said body being integral with the at least two branches;
 and including at least one of the following steps
 integrally molding at least one reinforcement member with the shock tower body at a first overmold interface to form a single-piece component, wherein the at least one reinforcement member is comprised of at least one of a metal and a continuous fiber reinforced polymer composite material, or
 integrally molding a wheel cover comprised of a polymer composite material with the shock tower body to form the single-piece component.

15. The method according to claim 14 wherein the at least one reinforcement member comprises at least one first reinforcement member comprised of the metal material and at least one second reinforcement member comprised of the continuous fiber reinforced polymer composite material, and including
 integrally molding the at least one first reinforcement member to the shock tower body via the first overmold interface, and
 integrally molding the at least one second reinforcement member to the shock tower body via a second overmold interface.

16. The method according to claim 15 including forming at least one third overmold interface that integrates at least one of a nut, fastener, and sleeve into the single piece component.

* * * * *